May 18, 1926.

J. G. MACLAREN 1,585,303

CENTRAL DISTRIBUTING APPARATUS FOR DISPATCH SYSTEMS

Filed April 27, 1922  3 Sheets-Sheet 3

INVENTOR.
JAMES G. MACLAREN
BY
ATTORNEY.

Patented May 18, 1926.

1,585,303

UNITED STATES PATENT OFFICE.

JAMES G. MACLAREN, OF MAMARONECK, NEW YORK, ASSIGNOR, BY MESNE ASSIGNMENTS, TO THE LAMSON COMPANY, A CORPORATION OF MASSACHUSETTS.

CENTRAL DISTRIBUTING APPARATUS FOR DISPATCH SYSTEMS.

Application filed April 27, 1922. Serial No. 556,865.

This invention relates to central station distributing apparatus for dispatch systems.

One of the objects of the invention is to utilize a single stretch of a belt conveyor for transferring carriers from any group of a series of groups of receiving terminals to any member of a group of operators' stations, or for transferring carriers from all the receiving terminals to one or more of the operators' stations at will.

I achieve this and other objects by utilizing a horizontally traveling belt conveyor having vertically spaced apart stretches, and arranging the receiving or discharge terminals of a series of groups of pneumatic dispatch tubes along the belt stretches. Preferably separating devices are provided for causing one class of carriers conveyed by the tubes, such as the carriers containing credit memoranda as used by department stores, to discharge on the upper reach of the belt for transfer to an authorizing clerk, and the remaining class of cash carriers to be discharged on the lower stretch of the belt. For the purpose of the invention the lower belt is divided by suitable longitudinally extending partitions into a plurality of ways equal in number to the maxmum number of operators' stations to be served and also preferably equaling the number of groups of discharge terminals for the dispatch tubes.

In order to cause any given group of discharge terminals of the incoming tubes to deliver carriers into any longitudinally extending way on the lower reach of the conveyor belt, laterally movable guides, for example hoppers or receiving chutes are provided for each group of terminals. Preferably each receiving chute is adapted to receive carriers from the line of terminals on each side of the belt in each group and is provided with two longitudinally extending delivery openings in its lowermost portion which discharge carriers received from the tube terminals into any pair of adjacent ways on the lower reach of the belt.

Preferably each longitudinal way of the belt delivers carriers to a dispatch tube individual to one of a group of operators' stations and further means are preferably provided for causing carriers transferred from a pair of ways to be delivered conveniently for handling by one or more of the operators at the operators' stations.

Other features of the invention will be hereinafter referred to.

In the drawings in which a preferred embodiment of the invention has been selected for illustration.

Figure 1:
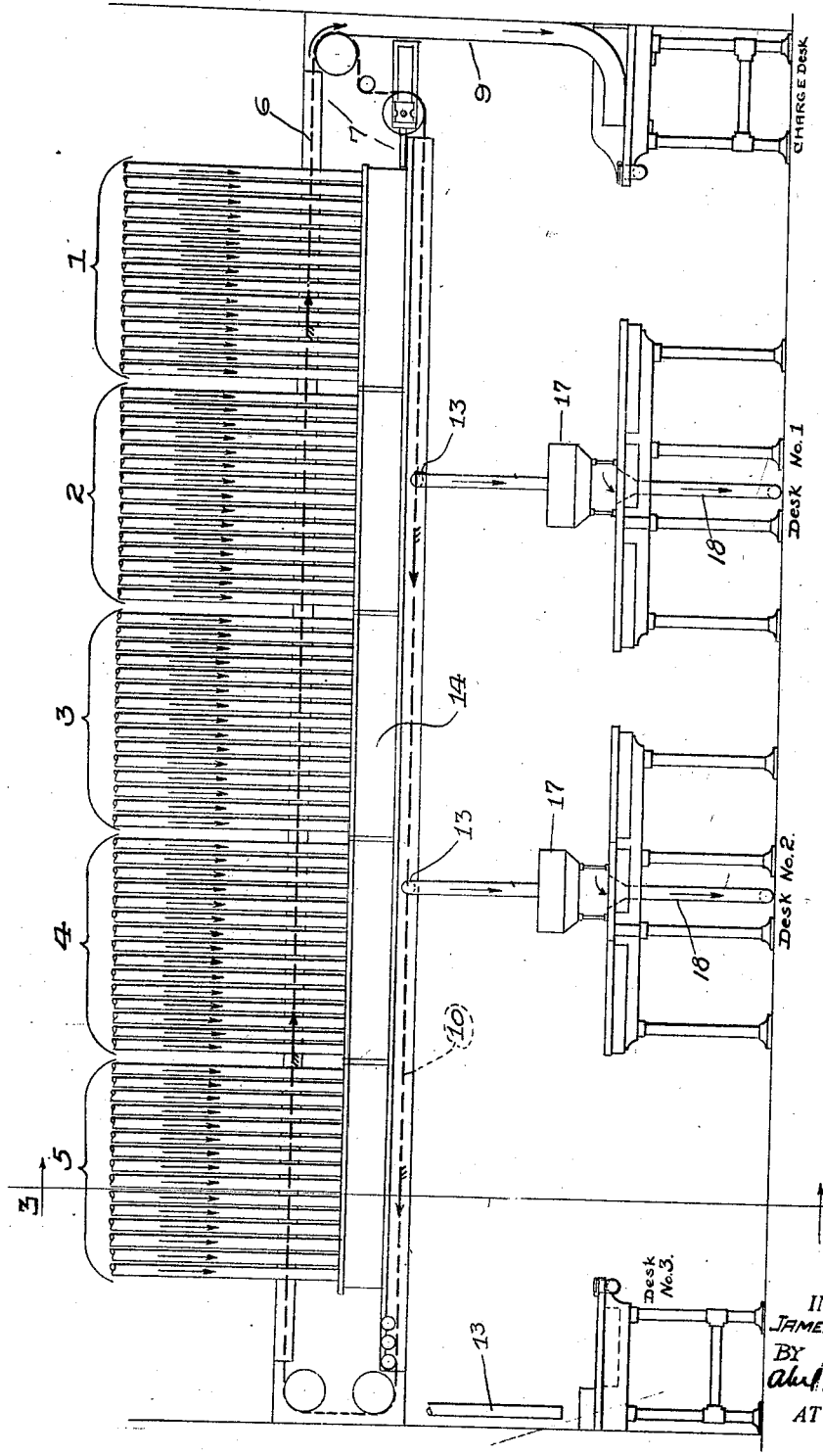
Figure 1 is a view in side elevation of apparatus embodying the invention.

Referring to the drawings, a plurality of groups 1, 2, 3, 4 and 5 of incoming dispatch tubes are arranged along the opposite sides of the upper reach 6 of a belt conveyor 7. Preferably sorting mechanism is provided for causing one of two classes of carriers conveyed by the tubes to be discharged through the upper ports 8 onto the upper reach 6 of the belt for delivery into the receiving chute 9 to the station of an operator who may be a charge or credit authorizer.

Figure 2:
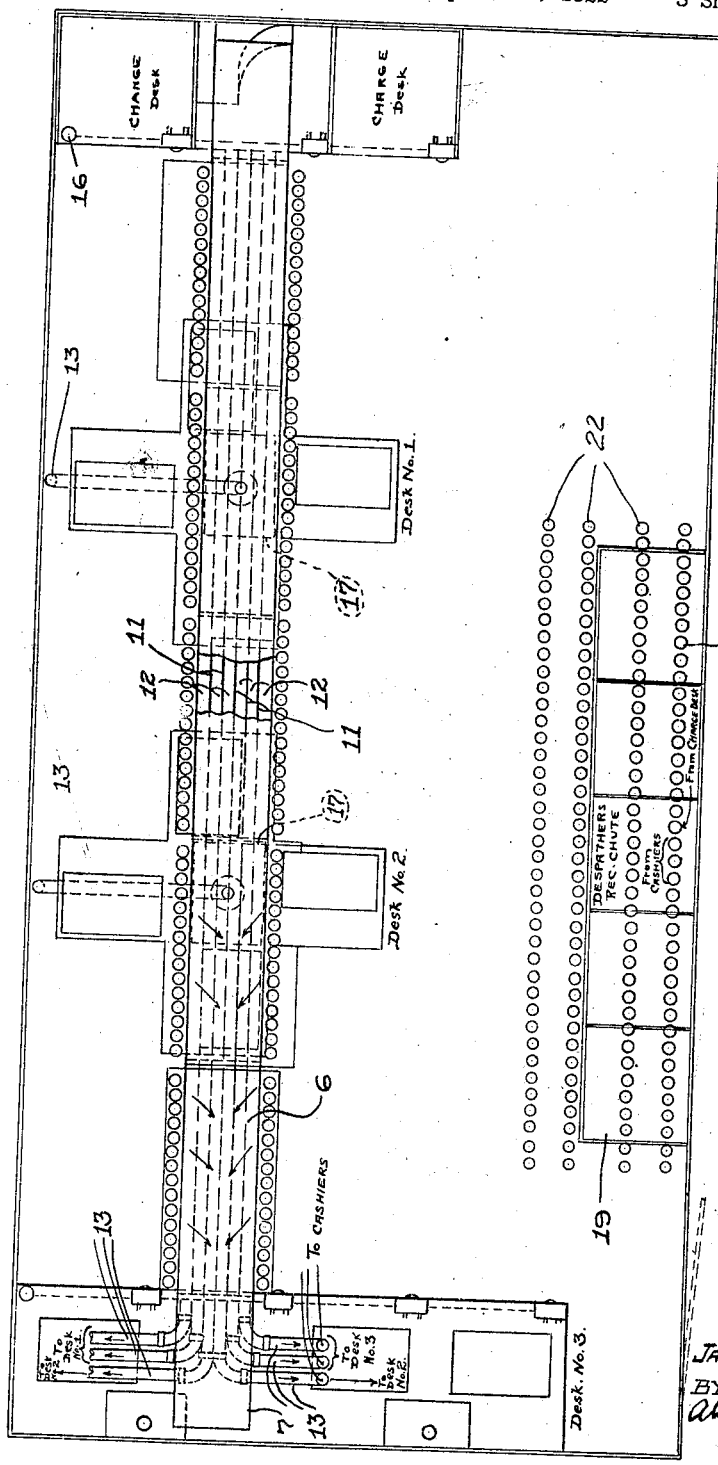
Figure 2 is a plan view of the apparatus shown in Figure 1.

The lower stretch 10 of the belt 7 is beneath the lower ends of the tube terminals and is provided with a series of longitudinally extending partitions 11 which divide the lower belt stretch into a number of ways or lanes 12 preferably equal in number to the number of groups of incoming tubes. Each lane or way 12 delivers, at the left hand end of the belt as viewed in Figure 2, into a dispatch tube 13, each tube leading to a terminal discharging into an elongate receptacle 17 located adjacent to a group of operators' stations.

Figure 3:
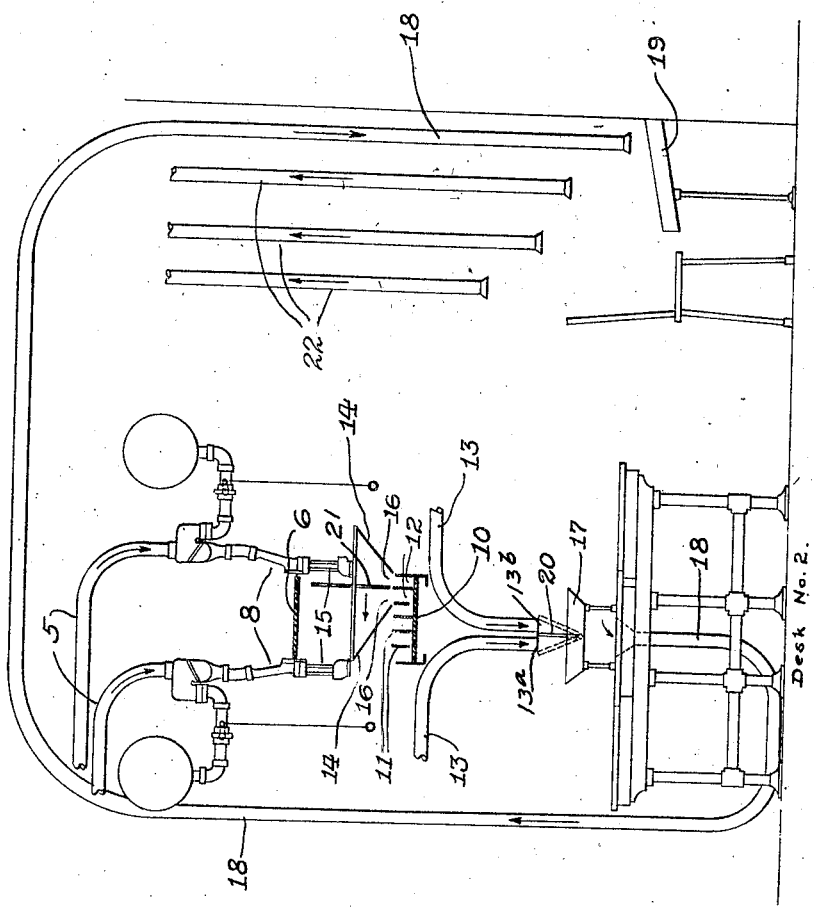
Figure 3 is a vertical section, partly in elevation of the apparatus shown in Figure 1, taken along the line 3—3.

In order to direct carriers discharged from the terminals of the incoming tubes into the desired ways 12, guides or hoppers 14 are provided, each of which preferably equals the length of one of the group of tubes and is located between horizontal planes of the lower delivery ports 15 of the group and of the ways 12 of the belt stretch 10 respectively. Each guide or hopper 14 is supported to move and preferably to slide transversely of the belt. The entrance or receiving mouth of this guide hopper is large enough so that in all positions it will gather in carriers delivered from ports 15 at both sides of the belt. The guide hopper is provided with a central vertical partition 21 and with narrow independent discharge ports 16, adapted respectively to register with any two contiguous lanes 12 of the conveyor, as is indicated in Fig. 3 of the drawing.

In operation and under conditions requiring the services of the maximum number of operators for the lower belt stretch, in the case illustrated, twelve, each one of the guiding hoppers 14 is so disposed laterally with relation to the corresponding groups of tubes that each of the six lanes 12 will convey carriers from a single group of tubes. For instance with the receiving chutes constructed to deliver to two lanes, two of the receiving chutes would be positioned to deliver to the first and second lanes, two more of the chutes to the third and fourth lanes and so on.

The carriers received by the pneumatic dispatch tubes 13 are delivered through the corresponding discharge terminals 13ᵃ and 13ᵇ into one of the receiving receptacles 17. For instance dispatch tubes 13 leading from the first and second lanes may deliver into the receiving receptacle 17 for station No. 1, lanes 3 and 4 into the receptacle for desk No. 2, and lanes 5 and 6 into the receptacle for desk No. 3. Each receptacle is provided about midway of its length with a normally vertical deflector plate 20 hinged at its lower edge and adapted to keep separate the carriers which arrive through the tube terminals 13ᵃ and 13ᵇ, respectively. Suitable means, not shown, is provided for swinging this deflector in one direction or another so as to direct all carriers at will from both terminals 13ᵃ and 13ᵇ toward one or the other end of the receptacle.

Upon treatment of the contents of the carriers, making change and the like, the treated carriers are dispatched through tubes 18 for delivery at a dispatching desk 19 from whence an operator dispatches the carriers from all of the stations, including the credit authorizer's station, through tubes 22 to the sales stations or other points of original dispatch throughout the building.

Upon a lessening or slackening of work such that fewer than the maximum number of operators is required, the guides 14 can be arranged to deliver all the carriers received to less than the whole number of operators' stations. For instance, all the guides can be arranged to deliver all the carriers to the first and second lanes for delivery in turn to the receiving hopper 17 of desk No. 1. A still further constriction of the delivery can be effected by manipulation of the gate 20 at each receptacle 17 to cause carriers arriving from both tubes to be delivered into the same side of the receptacle for handling by one of two operators.

Preferably the laterally movable guide hoppers 14 are formed of plates of wire reinforced glass.

By means of the described apparatus I am enabled to provide a relatively high degree of variation in the flexibility and range of operation to fit the operation of the apparatus to the changing demands for service from hour to hour with an accompanying efficiency and economy of operation.

What I claim is:

1. Distributing apparatus for a pneumatic dispatch system comprising a conveyor for carriers, carrier delivery means, and movable guide means adapted to receive carriers from the delivery means and to deposit them upon the conveyor, said guide means being adjustable to vary the point of deposit of carriers widthwise of the conveyor.

2. In distributing apparatus for dispatch systems, an elongate conveyor, dispatch tubes having their discharge terminals arranged at the side of the conveyor, means for dividing the conveyor into longitudinally extending ways, and a guiding device adjustable transversely of the conveyor and arranged to receive carriers from one at least of said tubes and deposit such carriers in a selected one of said ways.

3. In distributing apparatus for dispatch systems, a belt conveyor, dispatch tubes having their discharge terminals arranged along the belt conveyor, means for dividing the conveyor into longitudinally extending ways, and a guide hopper arranged to receive carriers from one at least of said tubes and to discharge carriers into one of said ways, said hopper being movable laterally to select the way into which carriers from a plurality of tubes shall be discharged.

4. In distributing apparatus for dispatch systems, a belt conveyor, dispatch tubes having their discharge terminals arranged in groups along the belt conveyor, means for dividing the conveyor into longitudinally extending ways, and a guide for each group of discharge terminals, said guide being movable to cause the carriers from the corresponding group of discharge terminals to be discharged into any selected one of said ways.

5. In distributing apparatus for dispatch systems, a belt conveyor, dispatch tubes having their discharge terminals arranged in oppositely disposed groups along both sides of said conveyor, means for dividing the conveyor into longitudinally extending ways, and a guiding hopper for each pair of groups having a compartment for each oppositely disposed group, said guiding hopper being movable laterally to cause carriers from the oppositely disposed groups to be discharged into any two adjacent ways.

6. In distributing apparatus for dispatch systems, a belt conveyor, means dividing the belt into longitudinally extending ways, dispatch tubes arranged to discharge carriers into said ways, and pneumatic dispatch tubes arranged to receive carriers from said ways.

7. In distributing apparatus for dispatch systems, a belt conveyor, means dividing the belt into longitudinally extending ways, dispatch tubes arranged to discharge carriers into one or more of said ways, and pneumatic dispatch tubes arranged to receive carriers from said ways.

8. In distributing apparatus for dispatch systems, a belt conveyor, means dividing the conveyor into longitudinally extending ways, dispatch tubes arranged to discharge carriers into one or more of said ways, a plurality of operators' stations, and pneumatic dispatch tubes arranged to receive carriers from said ways and deliver the carriers at the operators' stations.

9. In distributing apparatus for dispatch systems, a belt conveyor, means dividing the conveyor into longitudinally extending ways, dispatch tubes arranged in groups along said conveyor, a plurality of operators' stations, pneumatic dispatch tubes arranged to receive carriers from said ways and deliver the carriers at the operators' stations, and means for causing any one of the group of dispatch tubes to discharge carriers into any of said ways whereby to cause carriers from any of the groups of tubes to be delivered at any of the operators' stations.

10. In distributing apparatus for dispatch systems, a belt conveyor, means dividing the conveyor into longitudinally extending ways, dispatch tubes arranged in groups along said conveyor, a plurality of groups of operators' stations, a two-compartment receiving receptacle at each group of stations, means for causing any group of dispatch tubes to discharge into any of said ways, dispatch tubes arranged to receive carriers from said ways, said tubes being arranged in pairs to deliver carriers into said receiving receptacles, and means for causing each pair of tubes to deliver into either compartment or both compartments of said receptacle.

11. Distributing apparatus for a pneumatic dispatch system comprising a belt conveyor for carriers, carrier delivery means disposed at opposite sides of the conveyor, and adjustable guide means arranged to receive carriers from the respective delivery means and to deposit such carriers at variably determinate points widthwise of the conveyor.

12. Distributing apparatus for a pneumatic dispatch system comprising a belt conveyor, partitions extending longitudinally of the conveyor dividing it into parallel ways, a plurality of discharge terminals spaced longitudinally of the conveyor, and movable guides for receiving carriers from the respective terminals and for depositing such carriers on the conveyor, said guides being independently adjustable to determine the conveyor way in which carriers from any selected terminal shall be deposited.

13. Distributing apparatus for a pneumatic dispatch system comprising a belt conveyor for carriers, carrier delivery means disposed at the side of the conveyor, and a guide device for receiving carriers from the delivery means, said guide device being arranged to slide transversely of its conveyor whereby to determine the point, widthwise of the conveyor, at which carriers shall be deposited.

14. Distributing apparatus for a pneumatic dispatch system comprising a belt conveyor for carriers, carrier delivery means disposed at the side of the conveyor, and a guide device for receiving carriers from the delivery means, said guide device being bodily adjustable transversely of the conveyor and having a wide entrance adapted in all positions of adjustment to receive carriers from the delivery means, and a relatively small discharge orifice for determining the point, widthwise of the conveyor, at which carriers shall be deposited.

15. Distributing apparatus for a pneumatic dispatch system comprising carrier delivery means, a plurality of operators' stations, and means including a conveyor belt for transferring carriers from the delivery means to the several stations, said transfer means being normally arranged to deliver substantially the same number of carriers to each station, the transfer means comprising adjustable elements positionable at will to cause transfer of all carriers to a single station.

16. Distributing apparatus for a pneumatic dispatch system comprising a desk having a plurality of operators' stations spaced along the same, carrier delivery terminals disposed in groups along the desk, and means adjustable at will to transfer carriers from any selected group of terminals to any selected station.

17. Distributing apparatus for a pneumatic dispatch system comprising an elongate desk having pairs of opposed operators' stations spaced longitudinally thereof, carrier delivery terminals disposed in groups longitudinally of the desk and above the latter, and means, comprising an adjustable guide hopper corresponding to each of said groups and conveyor means, for determining at will to which station carriers from any selected group of terminals shall be delivered.

18. Distributing apparatus for dispatch systems comprising a belt conveyor, means dividing the conveyor into longitudinally extending ways, delivery terminals arranged in groups along said conveyor, a plurality of groups of operators' stations, a receiving receptacle at each group of stations, means for causing any group of delivery terminals to discharge its carriers into any one of said ways, a conveyor tube arranged to receive carriers from each of said ways, said tubes being disposed in pairs each pair extending to one of said receptacles, and a deflector plate extending transversely of the receptacle and normally disposed in a vertical plane intermediate the delivery ends of the corresponding pair of tubes, said deflector being hinged at its lower edge and being adapted to be inclined in either direction from its normal position whereby optionally to direct carriers arriving through both tubes toward either end of the receptacle.

JAMES G. MACLAREN.